US005453671A

United States Patent [19]

Baier et al.

[11] Patent Number: 5,453,671

[45] Date of Patent: Sep. 26, 1995

[54] ELECTROMOTIVE ACTUATOR FOR A CENTRAL DOOR LOCKING SYSTEM OF A MOTOR VEHICLE

[75] Inventors: Joachim Baier, Heilbronn-Sontheim; Udo Baumeister, Bietigheim-Bissingen; Heiner Bayha, Sersheim; Uwe Fortwingel, Abstatt; Ronald Frey, Bonnigheim-Hohenstein; Rainer Johannsmeier, Pfedelbach; Heinz Leiter, Gemmrigheim; Dieter Losch, Igersheim; Rudolf Watzka, Bietigheim-Bisssingen, all of Germany

[73] Assignee: SWF Auto-Electric GmbH, Germany

[21] Appl. No.: 39,005

[22] PCT Filed: Jul. 29, 1992

[86] PCT No.: PCT/EP92/01719

§ 371 Date: May 13, 1993

§ 102(e) Date: May 13, 1993

[87] PCT Pub. No.: WO93/03245

PCT Pub. Date: Feb. 18, 1993

[30] Foreign Application Priority Data

Aug. 1, 1991 [DE] Germany .......................... 41 25 448.1

[51] Int. Cl.$^6$ ............................... E05B 47/00; H02P 1/54

[52] U.S. Cl. ............................. 318/466; 318/38; 318/54; 318/65; 292/144; 292/DIG. 3; 292/DIG. 23; 70/264; 70/277; 70/280; 70/237; 340/438

[58] Field of Search .................................... 292/201, 216, 292/142, 144, 336.3, DIG. 62, DIG. 3, DIG. 23, 254, 35, 333, 334, DIG. 2; 70/264, 275, 277, 279, 237, 280, 262, 237, 239, 243, 255; 364/424.05; 340/438, 825.31, 825.54; 74/89.15; 318/466, 34, 54, 65, 38

[56] References Cited

U.S. PATENT DOCUMENTS 4,364,249 12/1982 Kleefeldt .......................... 292/DIG. 23
4,440,006 4/1984 Kleefeldt ........................... 292/DIG. 3

(List continued on next page.)

FOREIGN PATENT DOCUMENTS 0433103 6/1991 European Pat. Off. .

(List continued on next page.)

*Primary Examiner*—William M. Shoop, Jr.
*Assistant Examiner*—John W. Cabeca
*Attorney, Agent, or Firm*—Dykema Gossett

[57] ABSTRACT

The invention relates to an electromotive actuator with a housing for a central door locking system of a motor vehicle having a first slide adjustable by a first electric motor between two end positions. The first slide can be connected with a door lock of the motor vehicle independently of the end position and is preferably decoupled from the electric motor in the end positions, so that the first slide is manually adjustable between its end positions. Such an electromotive actuator is provided with a theft protection capability in the sense that, after a windshield of a motor vehicle is smashed in, an unlocking of the door by the inside locking handle is no more possible because the parts of the actuator are not actuated by operating the inside locking handle. Finally, an unlocking operation initiated from the outside is possible when the theft protection is put into operation. The theft protection capability is achieved by providing a second slide which can be coupled with the first slide by a latch adjustably guided at one of the two slides transversely to the moving direction of the slides and engaging the other slide under the effect of a spring element. The latch can be pulled back from engaging the other slide against the effect of the spring element from one coupling position into a theft protection position by a second electric motor and a control device so that the latch, together with the slide at which the latch is guided, can be moved away from the control device in the theft protection position.

40 Claims, 7 Drawing Sheets

U.S. PATENT DOCUMENTS

| | | | |
|---|---|---|---|
| 4,802,350 | 2/1989 | Periou | 292/216 |
| 4,850,625 | 7/1989 | Hori et al. | 292/336.3 |
| 4,926,337 | 5/1990 | Komuro et al. | 364/424.05 |
| 4,932,277 | 6/1990 | Beaux | 74/89.15 |
| 4,978,154 | 12/1990 | Kleefeldt | 292/216 |
| 5,037,145 | 8/1991 | Wilkes | 292/336.3 |
| 5,238,274 | 8/1993 | Becker et al. | 292/201 |

FOREIGN PATENT DOCUMENTS

| | | |
|---|---|---|
| 3629557 | 3/1988 | Germany . |
| 3629558 | 3/1988 | Germany . |
| 3806326 | 1/1989 | Germany . |
| 3938680 | 3/1992 | Germany . |
| WO9005822 | 5/1990 | WIPO . |

FIG 6
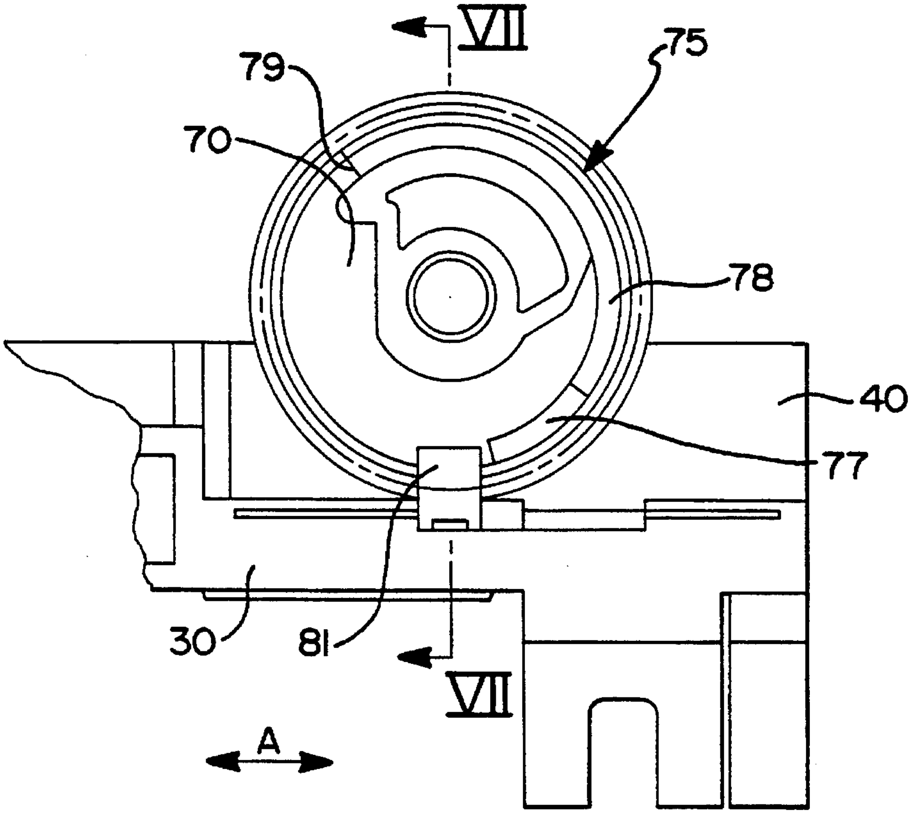
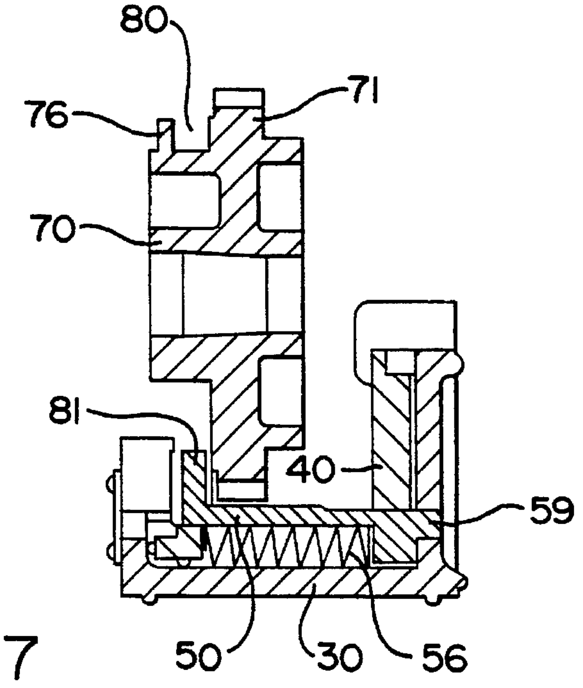
FIG 7

FIG 8
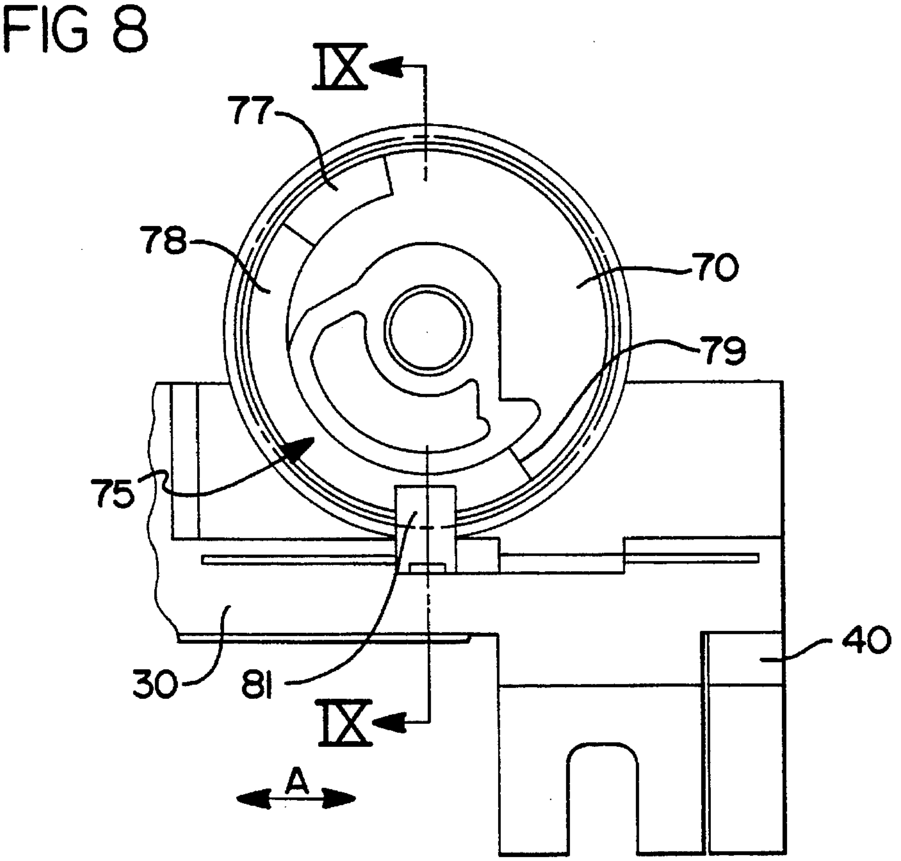
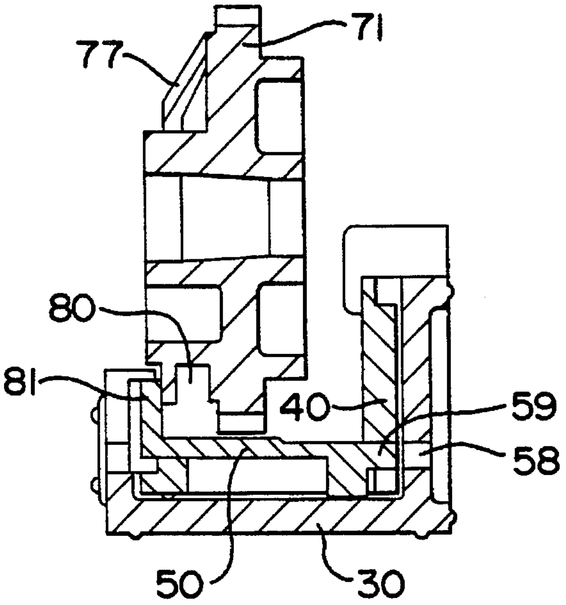
FIG 9

FIG 10
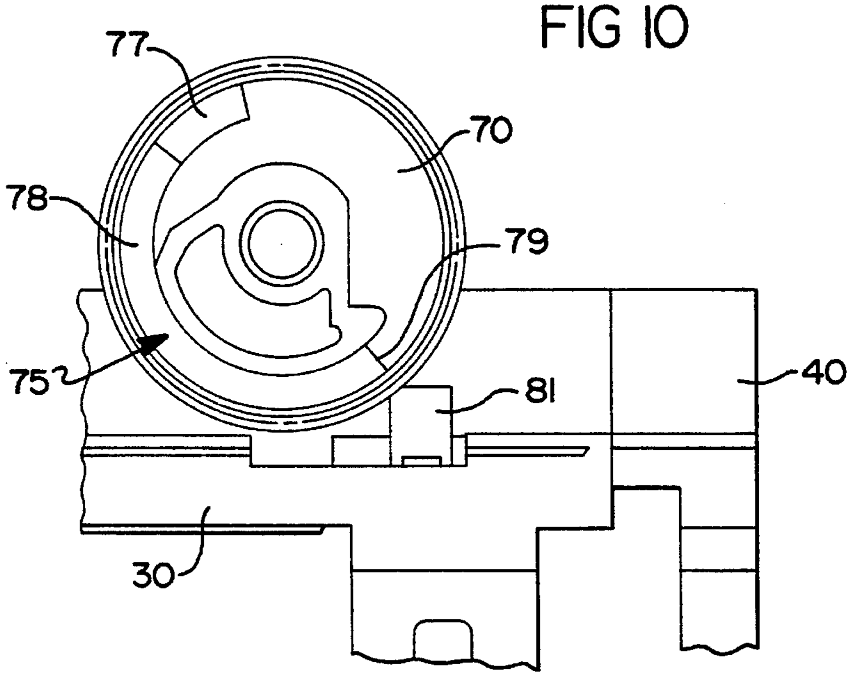
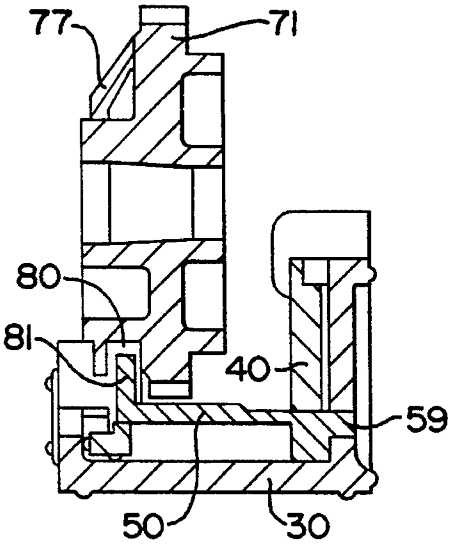
FIG 12
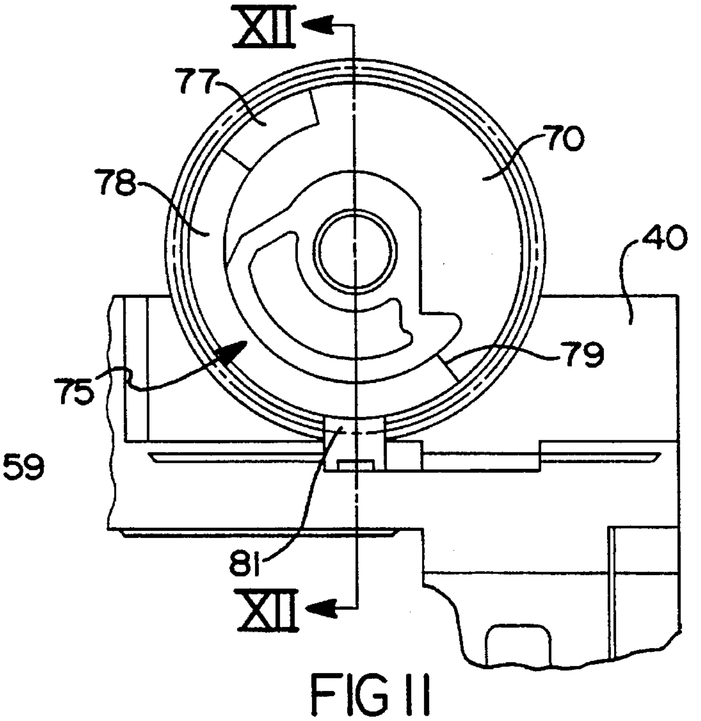
FIG 11

FIG 13
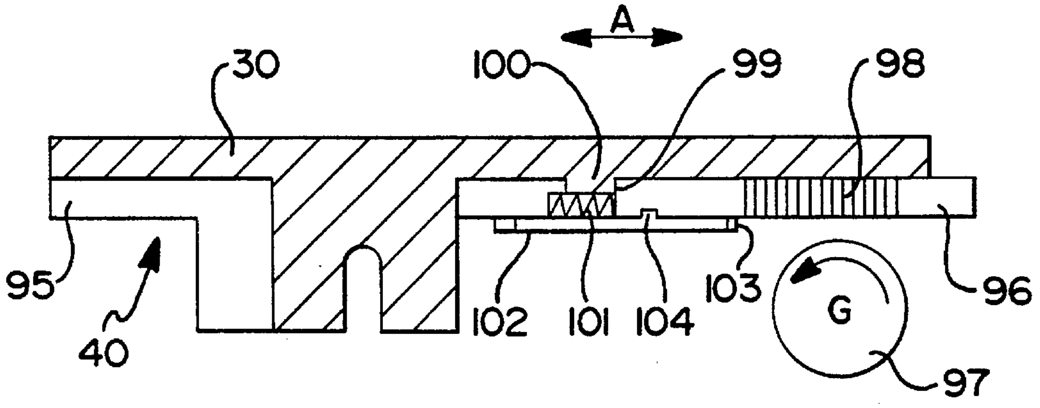
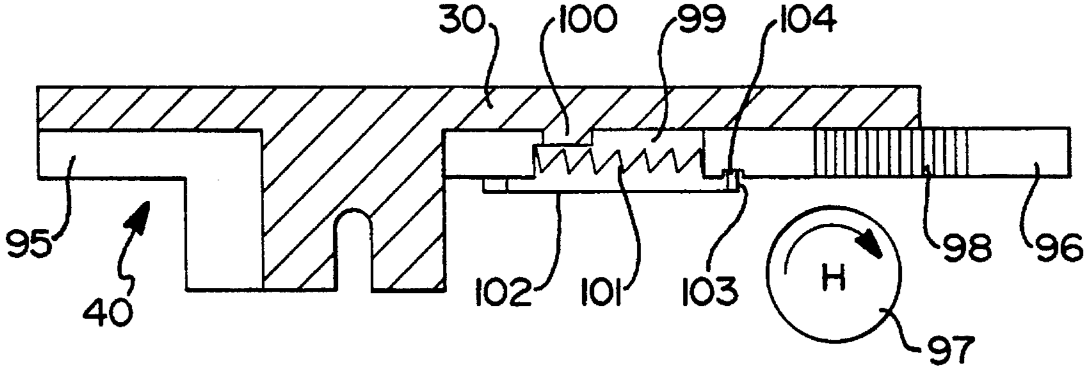
FIG 14

ELECTROMOTIVE ACTUATOR FOR A CENTRAL DOOR LOCKING SYSTEM OF A MOTOR VEHICLE

BACKGROUND

The invention refers to an electromotive actuator for a central door locking system of a motor vehicle having a slide which is adjustable between two end positions and connected to the door lock in either position and which can be decoupled from the electric motor in the end position so that it can be adjusted manually between the end positions easily.

An electromotive actuator of this type is known from DE-OS 36 27 893. This actuator has the advantage compared with an electromotive actuator, for example known from DE-OS 32 10 923, that the slide can be smoothly manually adjusted from its end positions. In the actuator of DE-OS 32 10 923 the electric motor and the gear wheels of the gearing, which is arranged behind said electric motor, have to co-rotate to allow manual shifting of the slide.

The actuator shown in DE-OS 32 10 923 for a central door locking system of a motor vehicle does not only allow a central locking or unlocking of a motor vehicle door, but also provides a so-called theft protection. In a central door locking system for a motor vehicle which is equipped with a theft protection it is possible to lock and unlock the door lock from the outside. In principle this is also possible with a handle in the inside of the motor vehicle. However, if the theft protection is put into operation from the outside, it is no longer possible to unlock the door lock with the handle on the inside. This is meant to make it more difficult for thieves to get inside the motor vehicle. In other words, if the windshield of a motor vehicle was smashed in, it is not possible to unlock the door with the handle in the inside of the motor vehicle and to then open it. It is only possible to enter through the window.

In the electromotive actuator according to DE-OS 10 923, the theft protection is realized by locking the slide by a latch which can be shifted by a second electric motor against movement in the unlocking direction. This has various disadvantages. In case of theft or in the case that the handle is operated from inside the motor vehicle, parts within the actuator are exposed to a major force, which can be effected by the handle on said parts. If no damage is accepted, the parts have to be designed correspondingly strong. It is also disadvantageous that it is impossible to unlock a vehicle door, once the motor operating the latch does not work in the theft protection position, for any reason. Finally, a lost travel in the gearing must be provided between the first electric motor, which is actuable, in principle, for locking in the reversed direction of rotation as well as for unlocking, in order to ensure that the blockage of the slide has been removed when the first motor engages in the slide.

Thus, the object of the invention is to create an electromotive actuator for a central door locking system providing theft protection without parts of the actuator being excessively strained in a theft attempt, and in which manual unlocking is also possible from the outside, even if the theft protection cannot be reset by the motor.

SUMMARY OF THE INVENTION

These requirements are achieved by an electromotive actuator providing a second slide which can be coupled with the handle inside the motor vehicle at least for unlocking the door lock. Furthermore, the second slide can be coupled with the first slide by means of a latch, which is adjustably guided at one of the two slides transversely to the stroke of the slides and engages into the other slide under the effect of a spring element. Upon engagement of the latch, the two slides can be regarded as one slide for the stroke, so that unlocking is possible from outside of the motor vehicle without any problems. For theft protection, the latch is pulled back by a second electric motor by means of a control device, so that it does not engage the other slide against the effect of the spring element. In this way, a motion transfer from the second onto the first slide is no longer possible, so that the second slide can be moved in the case of a theft attempt, whether the latch is guided at the second or at the first slide, even though the door lock is not disengageable. The force introduced into the handle inside the motor vehicle is not received by parts of the actuator because the second slide is movable.

Should the second electric motor fail to work for any reason while the door is locked and the theft protection is in operation, the first slide, regardless whether the handle is or is not guided at said slide, can still be brought from the locking position into the unlocking position from the outside or by the first electric motor. However, this also means that during the unlocking of the door lock from the theft protection position of the latch, a certain order in operating the latch and adjusting the first slide is not followed.

An alternate embodiment which realizes the object also resides in an electromotive actuator having a first slide, which can be connected with a door lock of a motor vehicle independently of direction and a second slide which can be coupled with a handle in the inside of a motor vehicle for unlocking. Both slides engage into each other with a jut and a recess transversely to their moving direction, and for theft protection, a carrier of one of the two slides can be moved relative to the slide in the moving direction of the two slides by an electric motor, the carrier engaging one of the slides in order to form a gap. After forming the gap, the second slide can be moved freely by way of the handle inside the motor vehicle without the first slide being entrained and the door lock being unlocked as a result.

In either embodiment, manual adjustment of the first slide is possible without having to move the first electric motor and gearing which is arranged behind the electric motor.

Hence, the second slide can be entrained by the firs slide independently of the latch. Thus, the second slide can be entrained by the first slide at once, when the door lock is operated from the outside, without the theft protection having been reset by the second electric motor beforehand.

The control device utilized is a control curve with a ramp. Seen from the fundamental mode of operation it is unimportant, whether the moving direction of the ramp at the latch when it is pulled back while setting the theft protection, corresponds with the direction of the slide during the locking or unlocking operation. It is more advantageous that while the latch is ascending the ramp, the ramp moves in a direction which corresponds to the moving direction of the slide during the locking operation. In this event, no force is effected by the ramp on the latch in the moving direction towards unlocking the slide so there is no danger that the setting of the theft protection is impaired or prevented by the slides moving slightly out of their end position.

Although normally the electric motors used in electromotive actuators for central door locking systems work reliably over a long time period, it cannot be excluded that such an electric motor might fail to work, and that the gearing members arranged behind the electric motor might then be in an undefined position. A manual locking of the door has to be guaranteed even under these circumstances. How this problem can be solved with regard to the first electric motor is described in detail in DE-OS 36 27 893. For the second electric motor, this problem is advantageously solved by providing that the latch can be pushed beneath the control curve when the slide is shifted out of the unlocking into the locking position.

As the ramp of the control curve might be situated in the course of the latch, the ramp of the control curve is formed resiliently in such a way that the latch can be pushed beneath the ramp or that it can be pushed through beneath the ramp when the slide is shifted out of the unlocking into the locking position. The precondition for this resilient quality of the ramp certainly is that said ramp is separated from its support at its foot.

In regard to the tool technics, the distance that the ramp is separated from its foot must not be too large to ensure the ascension of the latch onto the ramp. During the forming of the control curve, which is usually form from plastic material together with its support, the foot of the ramp has to be separated from its support by a tool section which is as thin as possible. So that this thin tool section does not have to be too long, the ramp is thinner at its foot than in the distance towards its foot.

The control curve is preferably situated at a gearwheel which can be driven by the second electric motor. In this case, the already mentioned precautions in order to avoid a failure of the second electric motor can be realized most easily by arranging the control curve in such a way that the latch can be moved by the control curve in direction of the axis of the gearwheel.

Following the ramp, the control curve advantageously comprises a plane section without a change of height. The second electric motor coasts for an uncertain period after it was switched off, which does not have an effect on the position of the latch, because of the plane section of the control curve. As long as the latch is guided at the second slide, it is moved to adopt the unlocking position together with the second slide in the case of a theft attempt. When the handle is set back inside the motor vehicle, it returns with the second slide into the locking position reaching again the plane section of the control curve. In order to facilitate this, the plane section comprises a slope declining in radial direction at its radial outside edge.

In order to keep the expenditure in control for the second electric motor small, it is actuatable only in one direction in order not to require complicated mechanical change-over mechanisms. Also the gearwheel can be driven by an electric motor in only one single direction of rotation. The second electric motor can be switched on for pulling back the latch as well as for pushing forward the latch through the resilient element, the gearwheel then being rotatable by about 180 degrees each time after the electric motor is switched on. However, because the latch can also be moved away from the control curve when the theft protection is in operation, it is not necessary in principle, that the second electric motor be switched on in order to reset the theft protection. Therefore advantageously, it is provided that the second electric motor can be switched on only for pulling back the latch, the gearwheel preferably being rotatable by 360 degrees each time after the electric motor is switched on. In such a design the number of switch operations and, if the gearwheel is turned by less than 360 degrees, the whole time of operation of the second electric motor can also be reduced. Furthermore, only one break contact is necessary for the end switch so that the number of electric lines within the actuator can also be reduced. While it does not have any influence on the method of operation during an unlocking operation, whether the second electric motor begins to run before the first electric motor, together with the first electric motor, after the first electric motor or does not run at all, it is necessary for setting the theft protection that the latch with the slides is in the locking position, so that the control curve can engage into the latch. Therefore, a time delay is necessary between the beginning of the adjustment of the slide from the locking to the unlocking position and the engagement of the control curve into the latch. This time delay may be provided, for example, by a delayed switching on of the second electric motor. In particular, the second electric motor can only be switched on, when the slides have reached the locking position and when it is reported by a signal, for example by an electric switch in the door lock. However, a time delay might also be obtained in that the motors are switched on at the same time, yet the gearwheel with the control curve running essentially more slowly than the gearwheel with the crank adjusting the slides or, in the case that the gearwheel with the control curve is turned by 360 degrees each time, the ramp meets the latch only after a rotation angle which is essentially in excess of 180 degrees. However, the latter solutions are not very safe because the time period necessary for adjusting the slides by the first electric motor can vary within wide ranges.

An advantageous embodiment of the electromotive actuator according to the invention with regard to the arrangement and guiding of the latch is realized by providing a helical spring situated in a blind-end bore of the latch and supported on an extension of the slide guiding the latch, which extension protrudes into the blind-end bore through a longitudinal slot, by which the blind-end bore is open to the outside. Consequently the latch is very long and can be guided correspondingly long. The travel of the latch out of its guiding is advantageously limited by a stop of the slide which does not guide the latch. In this way a stop at the slide guiding the latch is avoided so that the latch can be pushed easily into the guiding. The helical spring is laterally well supported in each position of the latch.

The space conditions may make it seem favorable that the latch is guided at the second slide. If, in opposition thereto, the latch is guided at the first slide the latch will not be entrained once the theft protection is in operation and the handle in the inside of the motor vehicle is operated, which leads to a movement of the second slide, but it remains at the control curve. It has not to be taken care of, that the latch remains in the theft protection position for example, by means of a support area at the first slide or at the housing or that it is pushed back into this position when the second slide returns.

The whole construction consisting of lock, electromotive actuator and handle in the inside of the motor vehicle as well as the mechanical connections between these parts may be chosen in the way that the second slide can be operated by means of the handle in the inside of the motor vehicle only in the sense of an unlocking of the door lock. To permit locking by way of the handle in the inside, it is provided that the slides be coupled via a carrier with the handle in the inside of the motor vehicle and that the carrier is situated in moving direction of the slides between said slides. On the other hand, when the second slide is operated via the handle in the inside of the motor vehicle in the sense of locking as well as in the sense of unlocking, the second slide can be directly form-fittingly coupled with the carrier into both moving directions.

Advantageous embodiments of an electromotive actuator according to the invention with regard to the guiding of the slides are provided by guiding the first slide at the housing and the other slide at the first slide. A correct assembly of both slides onto each other is guaranteed by providing two narrow grooves on one slide and two narrow rails on the other slide which engage the grooves, with one groove and rail being lower at one side than at the other.

In an electromotive actuator, the carrier can be moved advantageously against the effect of the spring element, which takes support at the associated slide. It seems also favorable that the carrier can be coupled with the associated slide by means of a locking device for limited force. In principle, this can happen in both operating positions of the carrier in relation to the associated slide. When a spring element is used, a coupling by a locking device for limited force only in one position is sufficient, namely in the one in which the jut is reduced or the recess enlarged. Without a spring element, one single locking device for limited force in the said position of the carrier is sufficient, if theft protection is provided for each locking operation.

An electromotive actuator using only one single electric motor, the direction of rotation of which can be reversed, adjustably coupled to the carrier with the electric motor may take place by means of a gearwheel driven by the electric motor and a toothed rack of the carrier. In this case the direction of rotation of the motor during the operation of the theft protection advantageously corresponds with the direction of rotation during the locking operation and advantageously corresponds with the direction of rotation during the unlocking operation while the theft protection is not in operation.

BRIEF DESCRIPTION OF THE DRAWINGS

FIG. 6 is a partial bottom view depicting the position of the latch relative to the control curve after an unlocking operation in a first alternate embodiment.

FIG. 7 is a cross-sectional view taken along line VII—VII of FIG. 6.

FIG. 8 is a partial bottom view depicting the position of the latch relative to the control curve with the theft protection also in operation.

FIG. 9 is a cross-sectional view taken along the line IX—IX of FIG. 8.

FIG. 10 is a partial bottom view depicting the position of the latch relative to the control curve after a handle was operated in the inside of the motor vehicle while the theft protection was in operation.

FIG. 11 is a partial bottom view depicting the position of the latch relative to the control curve in the theft protection position under conditions of a failure of the electric motor and where the door was unlocked once and again locked.

FIG. 12 is a cross-sectional view taken along the line XII—XII of FIG. 11.

FIG. 13 is a cross-sectional view of the two slides in a second alternate embodiment in the locking position depicting the two slides coupled by means of an extension and a recess, wherein the recess can be enlarged for the theft protection.

FIG. 14 depicts the embodiment of FIG. 13 in the locking position of the slides with the theft protection in operation.

DETAILED DESCRIPTION OF THE PREFERRED EMBODIMENT

Figure 1:
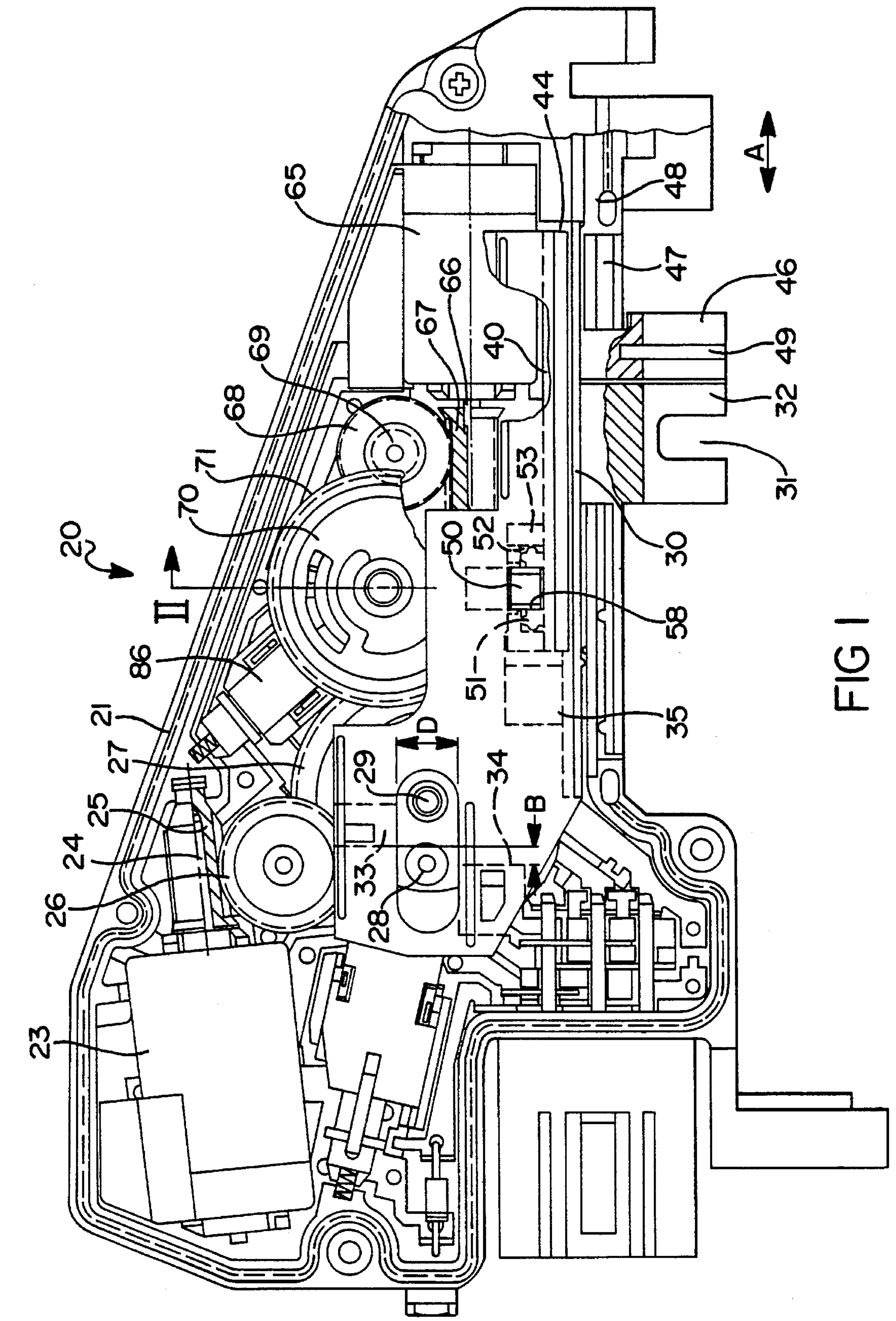
FIG. 1 is a top view of the first embodiment looking into the inside of the actuator with the first and the second slide being in an end position corresponding to a locked door.
Figure 2:
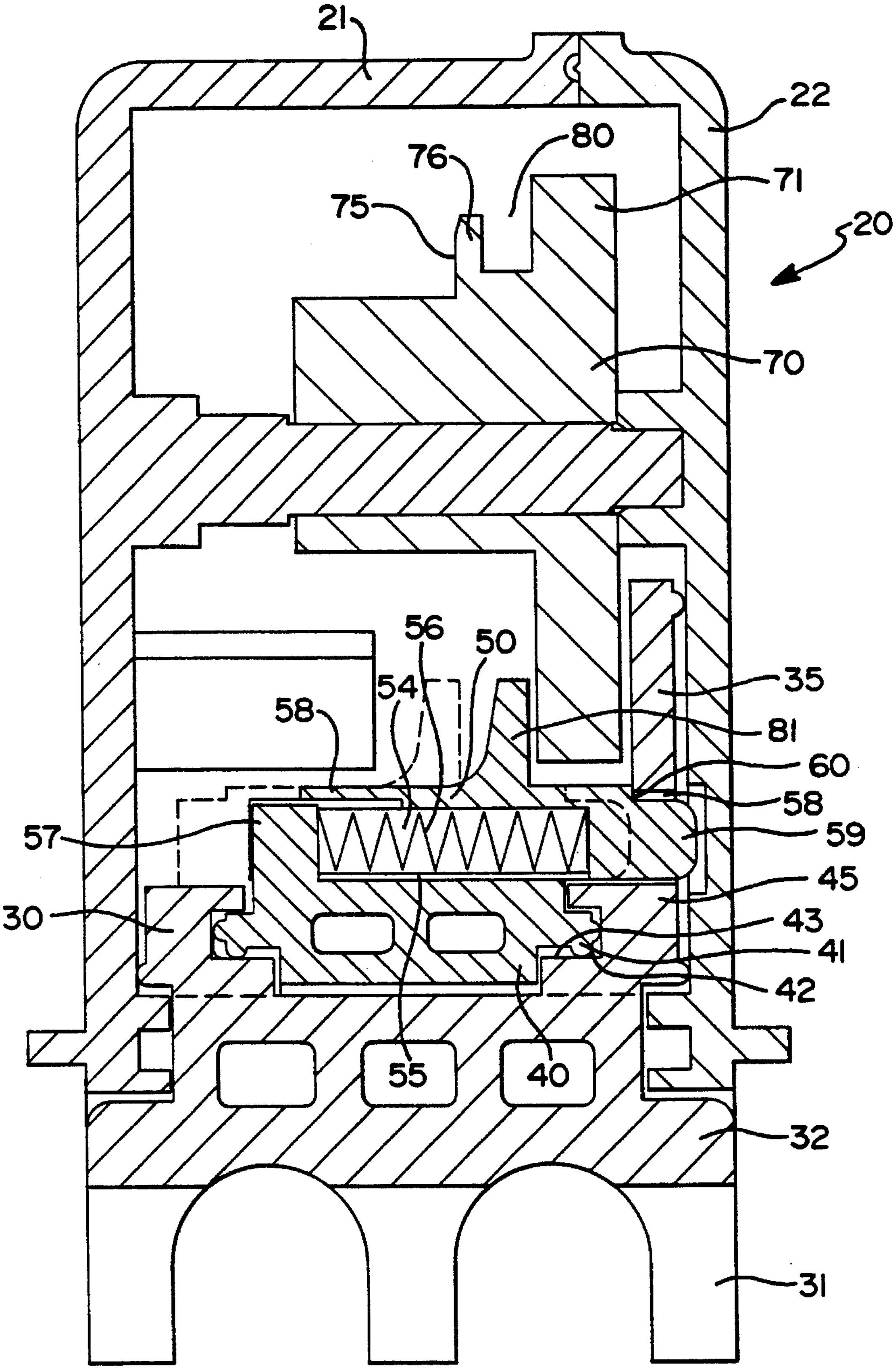
FIG. 2 is a cross-sectional view taken along the line II—II of FIG. 1.

In the actuator according to FIGS. 1 and 2, a first electric motor 23 is fixed in a housing 20 consisting of two pieces with a housing pot 21 and a cover 22 made of plastic material. Electric motor 23 drives a crank wheel 27 by means of a worm 25 situated on its shaft 24 and by means of a worm wheel 26 and a pinion which is integrally formed with the worm wheel 26. A conical reduced crank stud 28 sticks out of crank wheel 27, which therefore moves on a circuit. The axis of the worm wheel is marked with numeral 29.

In the housing 20, a slide 30 is movably guided in the longitudinal direction of double arrow A. The slide 30 can be connected with a connecting rod via U-shaped recesses situated at a lug 32 protruding from the housing 20 to act upon the door locking mechanism of a motor vehicle. At an extension 35 of the slide 30 running parallely to the cover 22 as seen from the top view according to FIG. 1. At the bottom side of the extension 35, two stops 33 and 34 are provided which cooperate with the crank stud 28. It can be seen from FIG. 1 that the distance B between the two stops 33 and 34 is much smaller than the radius of the crank wheel 27 in its adjusting direction which means that the distance of the crank stud 28 from the axis 29 of the crank wheel 27 is much smaller. This relationship facilitates a big stroke of the slide 30 if the radius of the crank wheel 27 is fixed. The distance D of the two stops 33 and 34 transversely to the adjusting direction of the slide 30 is only slightly larger than the diameter of the crank stud 28. In the end position of the crank wheel 27 and the slide 30 shown in FIG. 1, the crank stud 28 is situated between the two stops 33 and 34 in the direction transverse to the adjusting direction of the slide 30. In this end position, the slide 30 is completely decoupled from the crank stud 28 such that the crank wheel 27 and can be manually displaced from the shown end position into the other end position and back again by means of the already mentioned connecting rod. The same displacement of slide 30 applies if the crank wheel 27, the crank stud 28 and the slide 30 are situated in the other end position in which the crank wheel 27 is displaced by 180 degrees with respect to the position shown in FIG. 1.

If, starting from the position shown in FIG. 1, the electric motor 23 driving the crank stud 28 is switched on, the crank stud 28 rotates clockwise on its circular adjusting course. It then hits the stop of the slide 30 and is retrained by the stop 33 and slide 30 during the course of its movement into the other end position. After a rotation angle of 180 degrees the crank stud is stopped again. When the electric motor 23 is switched on again, the crank stud 28 hits the stop 34 of the slide and resets the slide again into the end position shown in FIG. 1 corresponding to a locked door.

On the whole this makes clear, that the crank stud 28 is rotated 180° in the same direction each time in each adjusting process. The crank stud 28 is coupled with the stops 33 or 34 and decoupled from the slide, only during the period its movement when it is located in the end positions, after a rotation angle of 180 degrees each time.

In principle, the slide is arranged parallely to a side wall of the housing 20 and engages with the thin extension 21 parallely to the cover and shortly beneath this cover into the housing pot 21. In the area of the side wall, at which the slide 30 is situated, a second slide 40 is guided in the direction of a possible movement of the second slide 40 relative to the first slide 30 in the direction of the double arrow A. The second slide 40 laterally comprises two rails 41 for guiding, which rails 41 engage into grooves 42 of the first slide 30 which are open at one end in order to engage the second slide 40 into the first slide 30. As can be clearly seen from FIG. 2, the one side wall 43 of the grooves 42 is higher than the other side wall. Correspondingly, the rails 41 at the side turned towards the side wall 43 are higher than at the other side, so that the slide 40 can be engaged only in one single relative position to the slide 30 into said slide. The open end of the grooves 42 is situated at the front side 44 of the slide 30. The two rails 45 of the slide 30, in which the grooves 42 are situated, are only connected in the area of the lug 32 and at the other end of the grooves 42. Therefore, the second slide 40 is mounted to the car between the front side 44 and the lug 32 of the first slide 30 by means of a lug 46 through the opening 47 in the side wall 48 of the housing 20, in a similar manner the slide 30 is mounted to the car with the lug 32. A catching plate can be inserted in a groove 49 in the lug 46 of the second slide 40, which, for example, can be operated by a handle in the inside of a motor vehicle via a Bowden cable. Therefore, the catching plate and second slide are form-fittingly coupled with each other in the direction of the double arrow A. In normal operation the two lugs 32 and 46 are directly in abutment, as shown in FIG. 1.

On the side of the second slide 40 turned away from the side wall 48 of the housing 20, a latch 50 is guided at slide 40 vertically to the adjusting direction of the slide 40, indicated by the double arrow A in FIG. 1 and vertically to the cover 22 of the housing 20. For guiding, the latch 50 engages into two grooves 52 of the slide 40 by means of two lateral rails 51. Grooves 52 are formed by two turned L-shaped rails 53 integrally formed onto the slide 40. The latch 50 is provided with a blind-end bore 54 in guiding direction, which opens in a longitudinal slot 55 towards the slide 40. The width of the slot 55 however, is smaller than the diameter of the blind-end bore 54, so that a helical pressure spring 56 put into the blind-end bore 54 cannot fall out of the blind-end bore 54 through the slot 55. The helical pressure spring is supported at the bottom of the blind-end bore 54 and at an abutment 57 of the slide 40, which engages into the pocket bore 54 through the longitudinal slot 55. In FIG. 2 a first end position of the latch 50 is indicated in continuous lines and a second end position of the latch in broken lines. It can be seen that the abutment 57 is covered by the wall 58 situated opposite the longitudinal slot 55 in each position of the latch 50, so that the helical pressure spring 56 supports itself safely at the abutment 57 in the prearranged position. The grooves 52 of the slide 40 are open at both sides and the rails 51 of the latch 50 continually equal, so that the latch 50 can be smoothly inserted into the second slide 40 towards the direction of the support area of the helical pressure spring 56 at the abutment 57. There is a rectangular opening 58 in the extension 35 of the first slide 30, into which the helical pressure spring 56 can press the head 59 of the latch 50 to the extent that the opening 58 aligns with the guide of the latch 50, until the latch 50 hits the side of the cover 22 opposite the extension 35 by means of a step. In a cross-section lying parallely to the extension 35 of the slide 30, especially in moving direction of the slides 30 and 40, the dimensions of the opening 48 and of the head 59 of the latch 50 are coordinated in such a way that only a little play exists between them.

When the head 59 of latch 50 engages into the opening 58 of the extension 35, the slides 30 and 40 are coupled with each other in both moving directions. From the fact that the lugs 32 and 46 abut into each other follows, that from the end position of the two slides 30 and 40, shown in FIG. 1, which corresponds to a locked door lock, the slide 30 can entrain the slide 40 by means of the lug 32 independently of the latch 50 into the end position, which corresponds to an unlocked door. In this case it is of no importance, whether the slide 30 is adjusted normally by the closing cylinder or by the electric motor 23. During the locking operation of the door locks, consequently, in case of a shifting of the slide 30 from the second end position into the end position shown in FIG. 1, the second slide 40 is entrained by the first slide 30 by means of the latch 50, wherein it is again of no importance, whether the first slide 30 is adjusted manually or by the electric motor.

Upon the engagement of the latch 50 into the opening 58 it is possible, to unlock or to lock a motor vehicle door by means of the inside locking handle. When the door is locked and the inside locking handle is operated, the second slide 40 is entrained by a carrier plate situated in the groove 49 of the lug 46 of the second slide 40 and the first slide 30, which transfers the movement onto the door lock by the latch 50. During a locking operation the slide 40 entrains the first slide 30 by means of the lug 46 respectively the latch 50.

While it should be possible to unlock the door from the inside at any time if the motor vehicle door is locked from inside, it is requested to have the ability to make it impossible to unlock the door from the inside, if the door is locked from the outside. It shall be avoided in this way, that in case of a theft attempt after the windshield of a motor vehicle was smashed in, the doors are to be unlocked by an operation of the inside locking handle providing easy access to the motor vehicle.

In order to facilitate this theft protection, latch 50 is provided which can be pulled back from the opening 58 of the slide 30 by a second electric motor 65, as long as the two slides 30 and 40 are in the locking position and the electric motor 65 is put under electric power. The electric motor 65 drives a gearwheel 70 by means of a worm 67 situated on its shaft 66 and by means of a worm wheel 68 and a pinion 69 integrally formed with the worm wheel 68. Gearwheel 70 is provided with a gear ring 71 directly beneath the extension 35 of the slide 30 and, from the point of view of the extension 35 comprises a control curve 75 beyond the gear ring 71, which control curve 75 spaced apart from the gear ring 71 on a radial flange 76 of the gearwheel 70, at the opposite side from gear ring 71.

Figure 3:
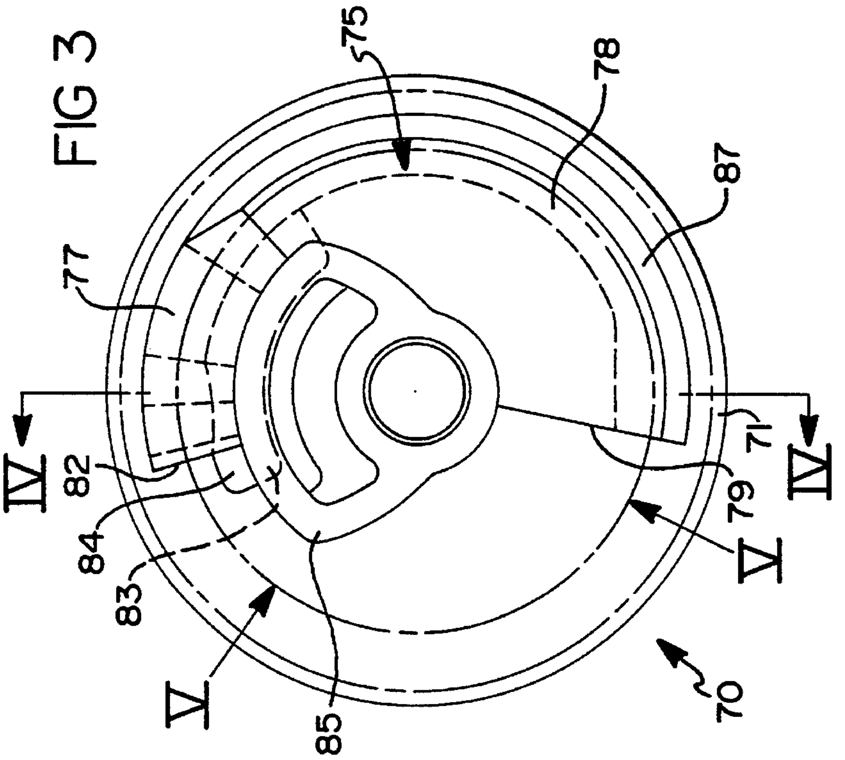
FIG. 3 is a bottom view of the gearwheel with the control curve for the latch which connects the two slides.
Figure 4:
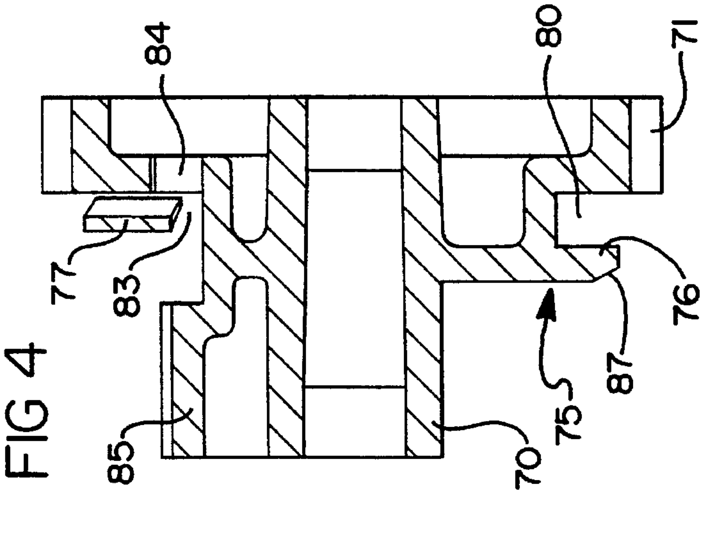
FIG. 4 is a cross-sectional view taken along the line IV—IV of FIG. 3.
Figure 5:
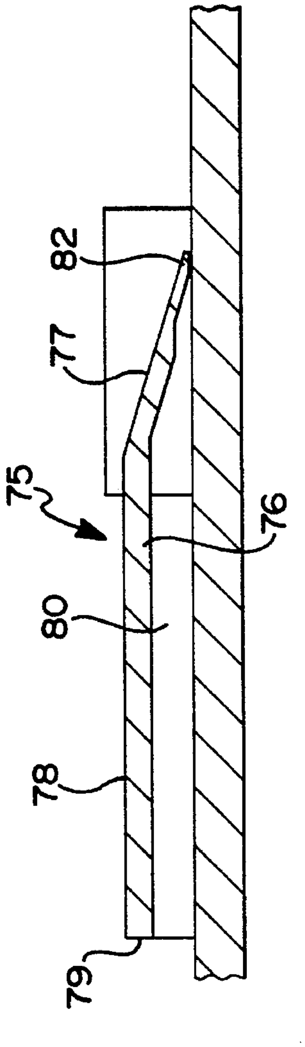
FIG. 5 is a cross-sectional view taken along the line V—V of FIG. 3.

Details of gearwheel 70 can be seen in FIG. 3 to 5. The control curve 75 extends over an angle of approximately 205 degrees and consists of a ramp 77 rising from the bottom side of the gear ring 71 and extending over an angle of 60 degrees and of a plan section 78 joining the ramp whose length extends 245 degrees. At the end 79 of the plane section 78 the control curve 75 stops abruptly. The flange 76 carrying the control curve 75 is cut free from the gear ring 71 by a surrounding groove 80, which is radially open to the outside. The groove 80 is wider than the curve follower 81 which is integrally formed with the latch 50 and which vertically extends the latch 50 towards the control curve 75 in the guiding direction of the latch 50. Curve follower 81 is situated directly beneath the gear ring 71 on the level of the groove 80 when the latch 50 is latched in the slide 30, as can be seen from FIG. 2. The groove 80 also continues beneath the ramp 77, although continuously decreasing in width according to the sloped position of the ramp 77. Groove 50 then has a section with a constant width as the ramp 77 becomes thinner and finally decreases its width until it nearly reaches 0. That the ramp 77 is thinner at its foot than in the distances towards its foot 82 is for tool technical reasons. Namely the ramp 77 is not only radially outside, but also on its foot 82 separated from the rest of the material of the gearwheel 70. However, in order to ensure that the curve follower 81 smoothly ascends the ramp 77, the distance between the foot 82 of the ramp 77 and the rest of the material of the gearwheel 70 should be small. This small distance has to be made with a section of a form tool which is very thin and therefore, presents a risk of fracture. Because the ramp 77 is thinner at its foot 82 than in the distance to the foot 82, the length of the tool section becomes smaller in the direction of rotation which therefore diminishes the risk of fracture. The ramp 77 is also radially inside separated from the rest of the material of the gearwheel 70 by a free cut 83, which can be ejected by an opening 84 in the gear ring 71 of the gearwheel 70. As can be seen from FIG. 3, the free cut 83 starts in the distance in front of the foot 82 of the ramp 77, seen in circulation direction, and ends shortly behind the transition between the ramp 77 and the plane section 78. Only at this transition is the ramp 77 connected with the rest of the material of the gearwheel 70. Therefore, ramp 77 can easily spring away from the gear ring 71.

The gearwheel 70 also carries a radial cam 85, by way of which an end position switch 86 for the electric motor 65 situated in the housing 20 can be operated. The switch 86 is a changing switch which is controlled by the cam 85 such that electric motor 65, always running in the same direction of rotation, is switched off after a rotation of the gearwheel 70 of approximately 180 degrees each time. The position of the cam 85 and the position of the control curve 75 are coordinated with each other in circulation direction such that the curve follower 81 of the latch 50 is situated shortly in front of the ramp 77 in one rest position, and in the other rest position of the gearwheel 70, shortly in front of the end 79 of the plane section 78 when the slides 30 and 40 are in locking position.

The way the electromotive actuator works according to the FIGS. 1 to 5 shall now be explained in detail by way of FIGS. 6 to 12. The FIGS. 6 and 7 show the slides 30 and 40 in locking position from which they can be returned to the unlocking position by a movement to the right in FIG. 6. In the state according to FIGS. 6 and 7, the latch 50 engages the first slide 30 with its head 59. If the inside locking handle is operated, the slide 40 entrains the slide 30 by way of the latch 50 to the unlocking position, so that the lock is unlocked. There was no theft protection put into operation. If the door is locked and the theft protection put into operation, a signal is generated by a longer operating of the closing cylinder, by a repeated operating of the closing cylinder or also by an operating of the closing cylinder for more than a certain period, which causes the electric motor 65 to be supplied with power when the slide 30 is in locking position. The electric motor 65 turns the gearwheel 70 clockwise by 180 degrees, as seen from the point of view according to FIG. 6, until it is switched off by the switch 86. The control curve 75 drives the ramp 77 under the curve follower 81 of the latch 50 and withdraws the head 59 from the opening 58 of the slide 30, with the position of the latch 50 being determined by the level of the plane section 78 of the control curve 75. When the electric motor 65 is switched off, the curve follower 81 of the latch 50 is situated near the end 79 of the plane section 78 in contrast to being located directly in front of the ramp 77 before the gearwheel 70 was turned by 180 degrees. If now, an inside locking handle of the gearwheel is performed, starting from the state according to FIGS. 8 and 9, only the slide 40 is moved to the right into the unlocking position. The position of the slide 30 does not change, however, so the door lock remains locked. When the slide 40 is moved, the latch 50 can be moved away tangentially from the plane section 75 of the control curve 75 without any problems. As soon as the curve follower 81 has left the plane section 78, the latch 50 is supported at a wall of the slide 30, so that curve follower 81 essentially keeps its level with regard to the control curve 75, and slides along the slide 30 with the slide 40. If the inside locking handle is moved back again, the slide 40 also moves into the position shown in FIG. 8, wherein the curve follower 81 again reaches the plane section 78 of the control curve 75. In order to facilitate the ascent onto the plane section 58, control curve 75 is provided with a slope 87 radially at the outside, as can be seen especially from FIG. 4. On the other hand, if the inside locking handle and with it the slide 40 remain in the unlocking position, the slide 30 will be adjusted in case of an unlocking from the outside, such that In the unlocking position of the slide 30, the latch 50 engages the opening 58 of the slide 30 under the power of the spring and in this way both slides are coupled again. The position of the single parts while the theft protection is in operation and after an operating of the inside locking handle into unlocking direction is shown in FIG. 10.

Now it may happen, that the electric power supply for the second electric motor 65 fails to work. The gearwheel 70 may be either in rest position according to FIG. 6 or in rest position according to FIG. 8, or in any interim position. It should always be possible to move the two slides 30 and 40 out of their unlocking position into the locking position, in order to be at least able to lock the door of the motor vehicle, even though it is not possible to protect against theft. In this case, the entire course for the curve follower 81 of the latch 50 has to be free. If the gearwheel 70 is in the position according to FIG. 6, which corresponds to the theft protection not in operation, the latch 50 can be moved independently, so that a locking is possible. Latch 50 must also be moved independently if the circumference section of the gearwheel 70 not carrying a control curve is in the course of the curve follower 81. If, on the other hand, the gearwheel 70 takes another rest position, as shown in FIGS. 8, 10 and 11, the groove 80 between the flange 76 and the gear ring 71 of the gearwheel 70 ensures that a locking is possible. In this locking operation the curve follower 81 can be pushed into groove 80, as can be seen from FIG. 12. If the ramp 77 is in the way of the curve follower 81 at the moment, curve follower 81 either slightly lifts the ramp 77 because of its resilient character or goes through completely beneath it. In this way, a locking is possible in each position of the gearwheel 70. Especially from FIG. 6, one can see that the direction of rotation of the gearwheel 70 when the curve follower 81 is ascending the ramp 77, is chosen in such a way that a power component actuated while curve follower 81 is ascending the ramp 77 acts to move the slides 30 and 40 in the locking direction. As the slides 30 and 40 abut on a stop in this direction, this power can influence the position of the slides. This direction of rotation also ensures that, if the electric power supply fails, it is possible to drive the curve follower 81 under the ramp 77 so that the curve follower 81 does not ascend the ramp should the ramp 77 by chance be in the area of the curve follower 81. In this way it can be achieved that, in case of a failure of the electric power supply for the electric motor 65, the theft protection is not put into operation in any case via the inside locking handle.

In the electromotive actuator according to the FIGS. 13 and 14, again a first slide 30 and a second slide 40 are provided. The second slide 40 consists of two parts 95 and 96, which are spaced apart in the moving direction of the slides 30 and 40, which is again indicated by the double arrow A. The part 96 may be described as carrier, as it can be moved relative to the part 95 in direction of arrow A by an electric motor, when the part 95 of the slide 40 rests opposite the slide 30. For this reason, the carrier 96 is provided with a steering rack section 98, into which a pinion of the electric motor 97 engages. A recess 99 is formed by the distance between the parts 95 and 96 of the slide 40, into which recess 99, the slide 40 is engaged by means of a jut 100. The two parts 95 and 96 of the slide 40 are drawn onto each other by a helical spring 101. In addition a locking spring 102 is fixed at the part 95 of the slide 40, which attaches over the carrier 96 and which engages a locking recess 104 of the carrier 96 by means of a locking device 103. The lock will be loosened in case of a certain influence of power in the moving direction of the slides, so that locking spring 102, locking device 103 and locking recess 104 can be described as a locking mechanism for limited power.

In the electromotive actuator according to FIGS. 13 and 14, the slide 30 is also guided at a housing 20, while the parts 95 and 96 of the slide 40 are guided at the slide 30 independently of each other.

The electric motor 97 is a motor with a reversible direction of rotation, which can be driven in one direction for the locking operation and the theft protection operation and in the other direction for the unlocking operation and for resetting the theft protection.

In the state shown in FIG. 13, the slides 30 and 40 may be in the locking position. If the motor is now switched on into the direction of the arrow G, the carrier 96 is pushed to the left. The carrier 96 entrains the slide 30 by means of the jut 100, so that the lock is unlocked. during the locking operation the electric motor 97 rotates into the other direction H, wherein the other part 95 and the slide 30 can be entrained by part 96 of the slide 40 by means of a helical spring 101, until they are in the locking position. If the electric motor 97 rotates further in the same direction, only the carrier 96 is displaced because of the increased tensioning of the spring 101, until the locking device 103 engages into the locking recess 104. The limited power for loosing this lock is chosen in such a way that the tensioned spring 101 cannot loosen the lock on its own. Therefore, the parts 95 and 96 remain in the position shown in FIG. 14, in which the recess 99 is essentially larger than the jut 100. If now an inside locking handle is operated which is connected with the part 95 of the slide 40, the parts 95 and 96 of the slide 40 are urged to the left, but the slide 30 remains is rest position. Thus, an unlocking of the lock is not possible.

During the unlocking operation according to the state shown in FIG. 14, the lock is disengaged at first so that the theft protection is reset and then the lock is unlocked by entraining the slide 30 because a certain resistance is put against the movement of part 95 of the slide 40 by the inside locking handle.

However, it is also possible in the state according to FIG. 14, that at first only the parts 95 and 96 of the slide 40 will be displaced to the unlocking end position of the part 95 before the carrier 96 takes along the slide 30 after disengaging the lock between the locking device 103 and locking recess 104.

The helical spring 101 is not necessary if a second locking recess for the locking device 103 in the carrier 96 is provided into which the locking device 103 can engage according to the position of the carrier 96 shown in FIG. 13. In this case, the carrier 96 entrains the part 95 of the slide 40 and the slide 30 during the locking operation by means of this further lock.

Finally, it is even possible to do without the helical spring 101 without a further lock if it is acceptable that during a locking operation only the carrier 96 is moved at first, enlarging the recess 99, until the locking device 103 engages into the locking recess 104 at which time the part 95 of the slide 40 and the slide 30 are adjusted. In case of an unlocking operation, again only the parts 95 and 96 of the slide 40 would be moved, before the slide 30 is entrained. In this case, the theft protection would be set into operation before the locking operation and reset only after the unlocking operation.

What is claimed is:

1. An electromotive actuator with a housing for a central door locking system of a motor vehicle, comprising: a first slide adjustable by a first electric motor between a lock position and an unlock position and the first slide being connected with the door lock of the motor vehicle independent of a position thereof and being decoupled from the first electric motor in the lock and unlock positions so that the first slide is manually adjustable between the lock and unlock positions; and a second slide coupled with a handle inside the motor vehicle for selectively unlocking the door locking system, the second slide operably coupled with the first slide for unitary sliding movement thereof with the first slide by a latch which is adjustably guided at one of the first and second slides transversely to the moving direction of the slides and engaging the other of the first and second slides in a coupling position under the effect of a spring element, the latch being withdrawn to a theft protection position by a second electric motor by means of a control device overcoming the effect of the spring element thereby moving the latch from the coupling position to the theft protection position wherein the second slide moves freely relative to the first slide, thereby preventing unlocking from inside of the vehicle and protecting against theft, the latch together with one of the first and second slides at which the latch is guided being moved away from the control device in the theft protection position.

2. The electromotive actuator of claim 1, further comprising a crank adjustable by the first electric motor through a swiveling angle of a 180° each time in the same turning direction such that the first slide is adjustable between the lock and unlock positions by the crank, the crank being coupled with the first slide only during a period of its swiveling direction and decoupled from the first slide in the lock and unlock positions after a swiveling angle of 180° each time.

3. The electromotive actuator of claim 1, wherein the second slide can be entrained by the first slide independently of the latch in the unlocking direction.

4. The electromotive actuator of claim 4, wherein the entraining is effected by lateral extensions of the slides.

5. The electromotive actuator of claim 1, wherein the control device is a control curve with a ramp.

6. The electromotive actuator of claim 5, wherein the ramp moves in a direction during the ascent of the latch which corresponds to the moving direction of the slides during the locking operation.

7. The electromotive actuator of claim 5, wherein the latch can be pushed beneath the control curve while the slides are adjusted from the unlocking into the locking position.

8. The electromotive actuator of claim 7, wherein the ramp of the control curve is formed resiliently in such a way that the latch can be pushed beneath the ramp or can be pushed through beneath the ramp as the slides are shifted from the unlocking into the locking position.

9. The electromotive actuator of claim 8, wherein the ramp is also cut free in the inside at the lateral edge opposite the latch.

10. The electromotive actuator of claim 9, wherein the free cut is slightly longer in the inside than the ramp.

11. The electromotive actuator of claim 8, wherein the ramp is thinner at its foot than in the distance towards its foot.

12. The electromotive actuator of claim 5, wherein the control curve is situated at a gearwheel which can be driven by the second electric motor.

13. The electromotive actuator of claim 12, wherein the latch can be moved away from the control curve towards the direction of the axis of the gearwheel.

14. The electromotive actuator of claim 13, wherein the control curve is situated behind the gear ring of the gearwheel, seen in the direction in which the latch can be moved by the control curve.

15. The electromotive actuator of claim 12, wherein the control curve comprises a plane section without a change of height following the ramp.

16. The electromotive actuator of claim 15, wherein the plane section comprises a slope declining in the radial direction at its outside radial edge.

17. The electromotive actuator of claim 12, wherein the ramp extends over an angle of approximately 60 degrees in the circulation direction of the gearwheel.

18. The electromotive actuator of claim 12, wherein the second electric motor is actuatable only in one direction of rotation and the gearwheel can be driven by the electric motor only in one single direction of rotation.

19. The electromotive actuator of claim 18, wherein the second electric motor can be switched on by the spring element for pulling back the latch as well as for pushing forward the latch and the gearwheel can be turned by 180 degrees after each time the electric motor is switched on.

20. The electromotive actuator of claim 19, wherein the control curve with its ramp and its plane section extends over an angle of 205 degrees in circulation direction of the gearwheel.

21. The electromotive actuator of claim 18, wherein the second electric motor can be switched on only for pulling back the latch and the gearwheel can preferably be turned by 360 degrees after each time the electric motor is switched on.

22. The electromotive actuator of claim 19, wherein the second electric motor can be switched off, after each time it was switched on, by an end switch which can be worked by the gearwheel such that the second electric motor is switched off, respectively, when the end switch is switched off and the position and length of the control curve are coordinated with each other in such a way that the latch, when in locking position of the slides and in a resting position of the gearwheel, is situated near the end opposite the ramp of the plane section, on said plane section or in a small distance towards the ramp.

23. The electromotive actuator of claim 1, wherein the spring element is a helical spring situated in a blind-end bore of the latch and is supported at a stud of the slide guiding the latch, the stud projecting into the blind-end bore 54 by a radial slot, the blind-end bore being open to the outside.

24. The electromotive actuator of claim 1, wherein the spring element presses the latch against a stop of the other of the first and second slides which does not guide the latch while the first and second slides are in the coupled state.

25. The electromotive actuator of claim 23, wherein a stud protrudes from the wall of the blind-end bore situated opposite of the radial slot and supports the helical spring when the latch abuts the stud.

26. The electromotive actuator of claim 1, wherein the latch is guided in two grooves with two rails situated opposite each other, each of the grooves being formed by a rail which is L-shaped in cross section and placed upon the one of the first and second slides.

27. The electromotive actuator of claim 1, wherein the latch is guided at the second slide.

28. The electromotive actuator of claim 1, wherein the latch is guided at the first slide.

29. The electromotive actuator of claim 26, wherein the second slide can be operated by a handle in the inside of the motor vehicle only in the sense of unlocking the door lock.

30. The electromotive actuator of claim 1, wherein the one of the first and second slides is guided at the housing and the other of the first and second slides is guided at the first slide.

31. The electromotive actuator of claim 30, wherein the first slide is guided at the housing and the second slide is guided at the first slide.

32. The electromotive actuator of claim 30, wherein the one of the first and second slides is provided with two narrow grooves and the other of the first and second slides with two narrow rails, which engage into the grooves and one groove and a respective rail is lower at on side than at the other one.

33. An electromotive actuator with a housing for a central door locking system of a motor vehicle, comprising: a first slide adjustable by a first electric motor between a lock position and an unlock position and connected with the door lock of the motor vehicle independent of the position and being decoupled from the electric motor in both of the end positions so that the first slide is manually adjustable between the lock and unlock positions; a second slide coupled with a handle inside the motor vehicle engaging a jut of the first slide extending transverse to their moving direction; and a carrier connected by a locking spring to the second slide and which can be moved relative to both the first slide and the second slide in the moving direction of the two slides by a second electric motor wherein the second electric motor operably displaces the carrier away from the jut of a first slide in the lock position to a theft protection position, thereby defining a gap between the jut and the carrier with the locking spring engaging the carrier and the second slide, wherein displacement of the handle toward an unlock position displaces the carrier and the second slide, leaving the first slide in the lock position.

34. The electromotive actuator of claim 33, wherein the carrier can be moved away against the effect of a spring element which is supported at the second slide.

35. The electromotive actuator of claim 2, wherein the carrier can be coupled in one position with the corresponding slide by a locking device for limited power.

36. The electromotive actuator of claim 33, wherein the second slide and the carrier are guided at the first slide independently of each other.

37. The electromotive actuator of claim 33, wherein the carrier is part of the second slide.

38. The electromotive actuator of claim 33, having a single electric motor whose direction of rotation can be reversed, adjustably coupled to the carrier.

39. The electromotive actuator of claim 38, wherein the gearwheel is adjustable by the electric motor and intermeshes a toothed rack of the carrier.

40. The electromotive actuator of claim 38, wherein the carrier can be adjusted after a locking of the door lock by a further turning of the electric motor in the same direction as in the locking operation.

* * * * *